July 4, 1933.  F. A. BIRD  1,917,010
EXTENSIBLE STAGE
Filed Aug. 1, 1930    6 Sheets-Sheet 1

INVENTOR.
Fred A. Bird
BY
ATTORNEY.

July 4, 1933.  F. A. BIRD  1,917,010
EXTENSIBLE STAGE
Filed Aug. 1, 1930  6 Sheets-Sheet 2

INVENTOR.
Fred A. Bird
BY
ATTORNEY.

INVENTOR.
Fred A. Bird
BY
ATTORNEY.

July 4, 1933. F. A. BIRD 1,917,010

EXTENSIBLE STAGE

Filed Aug. 1, 1930 6 Sheets-Sheet 5

INVENTOR.
Fred A. Bird
BY
ATTORNEY.

Patented July 4, 1933

1,917,010

UNITED STATES PATENT OFFICE

FRED A. BIRD, OF KANSAS CITY, MISSOURI

EXTENSIBLE STAGE

Application filed August 1, 1930. Serial No. 472,288.

My invention relates to elevators and more particularly to stages and like apparatus including a workman's platform for use in painting, cleaning, repairing or redecorating the interior or exterior of buildings or the like; the principal objects of the invention being to reduce the hazards incident to work of the character mentioned, to expedite and facilitate such operation and to provide a portable pressure operated extensible stage readily adjustable on its mountings to suit supporting surfaces and having elevating mechanism controlled by the workman.

In accomplishing these and other objects of my invention, I have provided improved details of structure, the preferred forms of which are illustrated in the accompanying drawings, wherein.

Referring in detail to the drawings:

1 designates generally an extensible platform-supporting mast, later described in detail, and 2 a base or support including preferably a relatively rigid and heavy channel bar having downwardly directed flanges 3 and upbent end branches 4 inclined outwardly for a purpose presently described.

Figure 4:
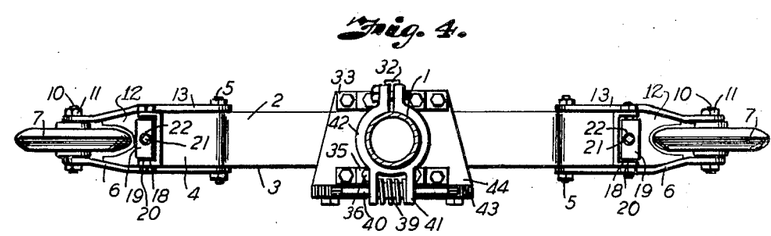
Fig. 4 is a section on the line 4—4, Fig. 1, a level and level-supporting brackets being omitted to show a worm.

Shafts 5 mounted in transverse openings at the ends of the straight portion of the base form studs to support forks or yokes including arms 6 spaced to accommodate rubber tired wheels 7 including webs 8 provided with annularly arranged openings 9, and having axles 10 mounted in openings in the outer ends of said arms and retained thereon by nuts 11. The arms diverge inwardly and have inner end portions 13 spaced sufficiently to engage the outer side faces of the rectilinear middle portion of the base bar 2 for mounting the inner ends of the arm portions 13 on the shafts 5. Plates or channel members 12 having edge flanges 13′ fixed to the arms stiffen and hold the arms in spaced relation, and are suitably recessed to accommodate the wheels as shown at the right in Figs. 4 and 8. Lock pins 17 extend through the arms into selected openings 9 for latching the wheels to the base against rotation.

Mounted in notches 18 formed in the ends of the bent branches of the base are cylindrical blocks 19 having studs 20 mounted in the ears formed by the ends of the base flanges. Threaded rods 21 engaging in threaded openings 22 in said blocks, and extending through openings in the spacing plates 12 have lower ends rotatively retained in blocks pivotally supported by studs 25 mounted in the plate flanges 13.

Cranks 26 may be applied to the upper ends of said threaded rods to move the wheel-supporting forks pivotally and adjust the angular relation between said forks and the base for adjusting the wheel forks and base to the contour of ground on which the device may be mounted, and holding the forks in selected pivoted position.

The mast 1 is hollow, including a plurality of telescoping cylinders or tubes such as 27, 28 and 29, and a platform or stage 30 is fixed to the topmost tube 29.

An end cap 31 is fixed to and closes the lower end of the lower tube 27, and a shaft 32 having a flattened middle portion fixed to the end face of said cap is removably mounted in arcuate recesses of bearing blocks 33 fixed to the base, and is retained therein by straps 34 having flanges 35 secured to the bearing blocks by bolts 36.

The bearing blocks 33 are located on the base at substantially the mid point thereof and preferably fixed by bolts 37 to a plate 38 attached to the base and extending laterally therefrom, whereby the mast is pivotally supported on the axis of the base to tilt longitudinally thereof.

The mast is pivotally operated and held in selected position by a worm 39 on a shaft 40 rotatable in bracket ears 41 projecting from a clamp collar 42 fixed to the mast tube 27, and meshed with a rack segment 43 fixed to a bracket 44 extending laterally from the base, the bracket being illustrated as including a flanged portion of said plate.

The rack segment 43 has a hub-like bearing opening 45 receiving the outer end of the shaft 32, and radial arms 46 supporting the arcuate toothed edge portion of the rack.

Spaced ears 47 projecting upwardly from the worm supporting bracket receive studs 48 on the ends of a level 49 having an axis perpendicular to the axis of the mast to facilitate vertical positioning of said mast.

The topmost tube is closed and means are provided for admitting a pressure medium to the mast and relieving pressure therefrom as later described.

Means for sealing the joints between the sliding tubes include a cap 50 having a skirt-like flange 51 screw-threadedly engaged with the outer face of the lower end of an upper tube such as the tube 28, a gasket 52 preferably formed of leather having a peripheral flange extending oppositely to the flange of the cap, a disk 53 mounted in the gasket, and screws 54 securing the disk and gasket to the cap.

Registering axial openings in the disk, gasket and cap form a restricted passage 55 for movement of fluid between the telescoping tubes.

A packing gland or bushing 56 is located in the upper end of a lower tube, for example the tube 27 and extends a substantial distance downwardly therein, and is fixed thereto by a collar 57 having a skirt-like flange 58 threaded on the tube 27 and a threaded internal shoulder 59 threaded on the upper end of the bushing. A flange 60 on the collar 57 defines the axial opening therein and snugly engages the upper tube 28.

The additional tubes comprising the extensible mast are similarly related to adjacent lower tubes, whereby one tube may slide back and forth in another and be restrained from separation therefrom by engagement of the caps 50 with the bushings 56.

The collars 57 may be provided with oil receiving and retaining grooves or reservoirs for feeding oil to the sliding surfaces of tubes moving through the collars.

I further preferably provide lazy tong connections between the several tubes to cause the tubes to move in unison, comprising short strips or bars 62 and 63 having inner ends pivoted to the collar on the upper end of the tube next below the uppermost tube 29, similar short bars 63' and 64 pivoted to a collar 57 fixed to the lowermost tube 27, a substantial distance below the upper end thereof, and pairs of relatively long bars 66 and 67 centrally pivoted on the collars of intermediate tubes and having outer ends pivotally connected to the outer ends of adjacent bars.

The collars are preferably provided with bosses 68 having threaded openings to receive shouldered studs or bolts 69 forming the pivotal mounting of the bars, and nuts 70 are fixed to the outer ends of the studs to retain the bars on the collars.

Threadedly mounted on the upper end of the topmost sliding tube 29 is a sleeve 71 having internal threads at its outer end to provide a threaded socket for a T fitting 72 having branches 73 and 74. Nipples 75 and 76 are threaded on the T branches and are provided with inlet and outlet control valves 77 and 78. A conduit 79 is connected with the inlet nipple whereby a pressure medium may be supplied under control of the inlet valve for extending the mast, the outlet valve being operable to relieve the pressure and permit the mast to retract. When both valves are closed the mast is thus sealed and retains the pressure medium.

Figure 1:
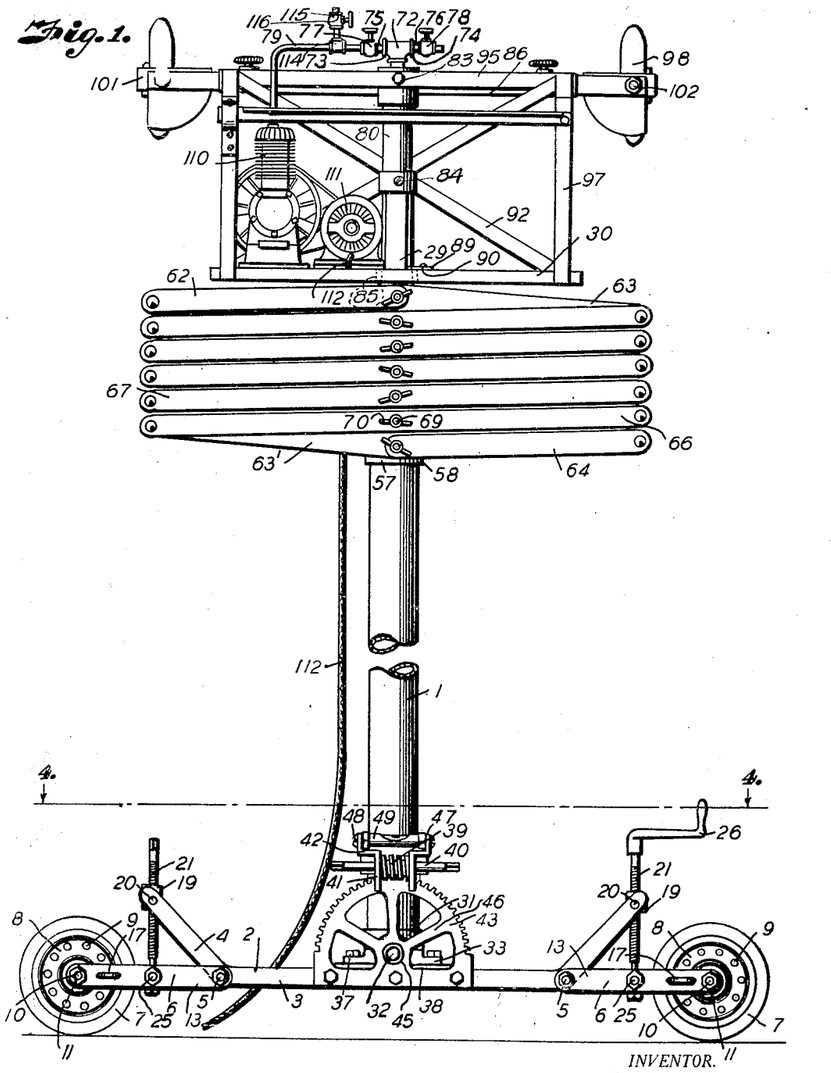
Fig. 1 is a front elevation of an extensible stage embodying my invention, the platform-supporting mast being shown fragmentarily.
Figure 2:
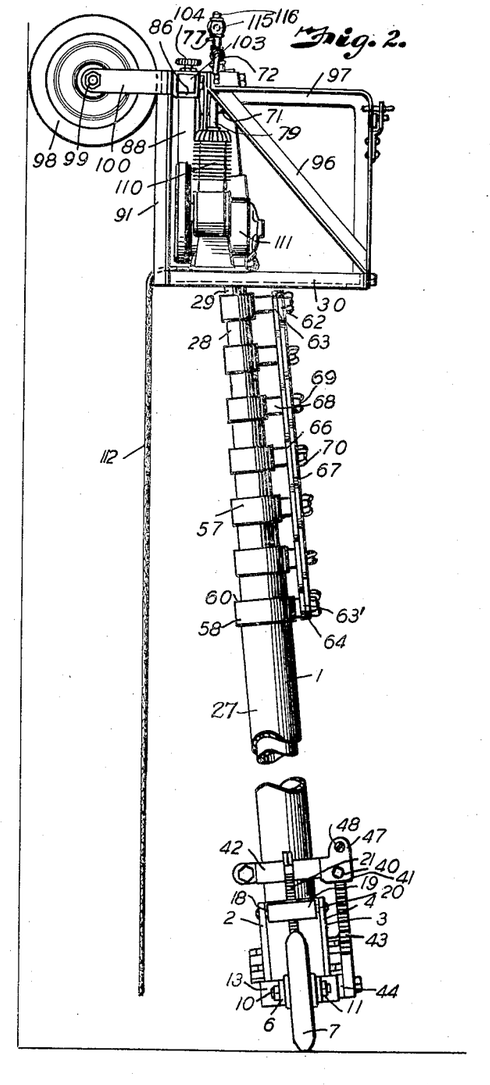
Fig. 2 is a side elevation of the device in tilted position, leaning against a surface.
Figure 3:
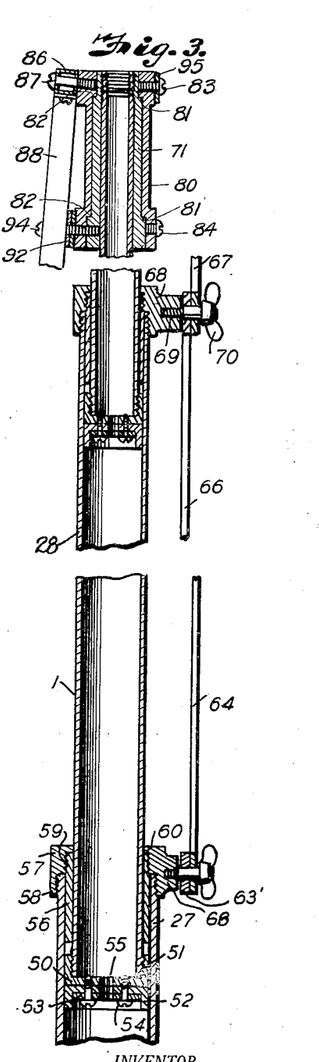
Fig. 3 is a fragmentary longitudinal section through the mast and lazy tongs connecting telescoping portions of the mast.

In order to secure the platform to the topmost tube 29 in desired angular position, a socket member 80 having internal shoulders 81 is sleeved over the sleeve 71 and the shoulders 81 bear against complementary shoulders 82 on the sleeve 71 and the socket member is fixed to the sleeve by set screws 83 and 84, Fig. 3. The platform is suspended from the socket member 80 as presently described.

The platform 30 is provided with an opening 85 for mounting the same over the topmost tube, and is supported by a bracket-like frame including a relatively rigid transverse bar 86 secured to a flattened face portion of the socket member 80 by screws 87, a vertical post 88 having an upper end fixed to said transverse bar, and a lower end fixed to the platform by foot flanges 89 and bolts 90. Vertical strips 91 connect the ends of the platform with the ends of the transverse bar.

Angular cross braces 92 having upper ends fixed to said transverse bar have intermediate portions crossing adjacent the lower end of the socket member in alignment with the post. The braces are bent from the crossing so that the lower ends of the braces may be fixed to the rear edge of the platform. The braces engage a flattened face on the socket member, and the vertical post is preferably connected to the collar by screws 94 extending through the post and cross braces into the socket member, whereby the braces space the post from the collar and cause the post to extend angularly to the axis of the mast.

A transverse strap 95 having outer ends fixed to the outer ends of the bar 86, extends on the opposite side of the upper end of the socket member from said bar, and is fixed to said socket member by the screw which secures the socket member to the sleeve 71.

The frame further includes angles 96 extending from the tranverse bar to the front edge of the platform, and side rails 97 extending forwardly horizontally from the transverse bar having vertical posts at their outer ends secured to the edge of the platform.

The structure so far described is adapted to be mounted on the ground adjacent a vertical wall or the like and to be tilted in a plane at right angles to the axis of the base toward the wall to lean thereagainst.

In order to support the leaning mast and platform in spaced relation with the wall and facilitate vertical and lateral movement of the platform over the wall surface, I provide wheels 98 mounted on axles 99 in the outer ends of forks comprising spaced arms 100 and arm-connecting webs 101 provided with studs 102 supported by said transverse bar. The forks are adapted to be latched in a selected position as presently described.

The wheel-supporting fork studs are preferably mounted on extension members 103 slidable in sockets formed in the ends of the transverse bar, and having square cross section, and may be fixed in selected extended position by set screws 104 mounted in said transverse bar whereby the wheels may be located in desired laterally spaced relation with the side edges of the platform to form a relatively wide wheel base, for example to span a window opening. The transverse bar may comprise rectangular tubing to permit use of relatively long plungers.

Arms 105 fixed to the webs of the wheel forks slide on plates 106 fixed to the transverse bar as the forks are rotated, and have bosses 107 movable into and out of sockets 108 formed in the plates whereby the wheels may be locked in selected pivotal position. The arms are relatively resilient and have offset extensions 109 forming handles for rotating the wheel forks to position the wheels for moving on either vertical or horizontal lines, or on arcs corresponding to the arc in which the mast moves when tilted by means of the worm and rack.

The resilient arms and bosses form relatively secure latches for retaining the wheels in an angular position due to the engagement of the bosses with the plates, and the sockets in the plates will securely latch the wheels in either vertical or horizontal position. It is apparent that any number of sockets may be provided to receive the bosses at any points in the paths of the bosses.

The pressure medium may be supplied to the T fitting from any suitable source, for example air being supplied from an air compressor.

I prefer for certain uses to supply the pressure medium to the hollow mast by an air compressor 110 and a compressor-operating electrical motor 111 mounted on the platform, and provide a flexible conductor 112 extending from a suitable source for supplying current to the motor.

A workman on the platform may employ any suitable tools for working on the surfaces, the apparatus being particularly adapted for use in connection with tools requiring a pressure medium such as compressed air. The platform may, for example be used for spray painting and for this and similar purposes the conduit is provided with a T 114 and valve 115 connected to a tube 116 to which a nozzle of any suitable form may be applied, whereby the pressure medium in the conduit may be employed to operate the tool.

Particles of materials used by the workman, for example sand or droplets of paint, and particles dislodged or dispersed by an air blast, may be carried by currents of air to other portions of the building or to adjacent areas to cause possible annoyance or damage. I therefore provide a curtain 117 supported by a frame including brackets 119 fixed to the platform, including rod-like frame members adapted to receive rings 120 for suspending the curtain and permitting the curtain to be shifted to admit a workman to the platform. The portions of the curtain may shut in two or more sides of the platform and leave an opening for access to a wall by the workman.

Figure 11:
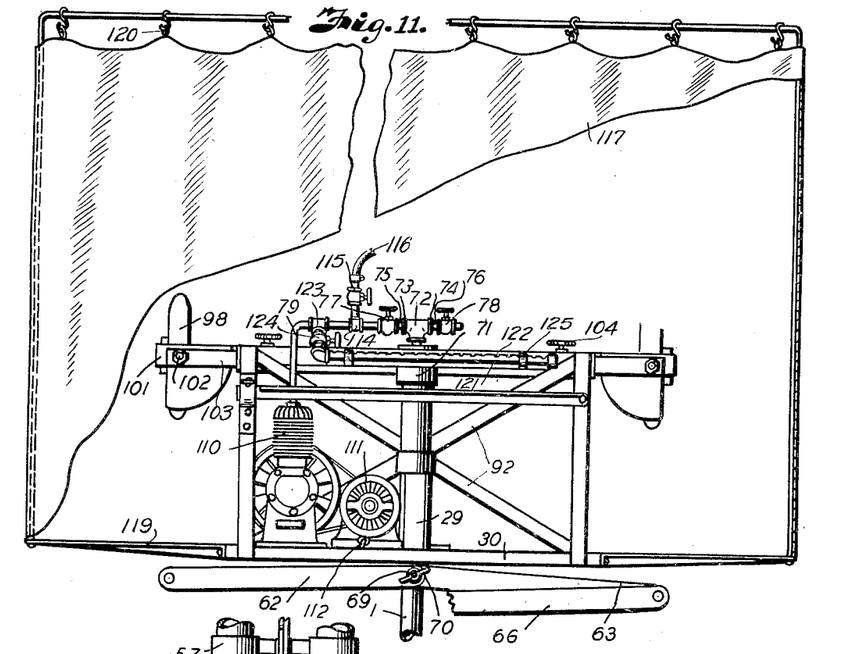
Fig. 11 is a front elevation of a platform and mast shown fragmentarily, illustrating a curtain for protecting the workman on the platform, broken away to disclose the apparatus on the platform.

It is apparent that a curtain may be provided to enclose any desired sides of the platform, to permit the workman to operate on either a vertical wall or a ceiling, in the illustrated application of the invention shown in Fig. 11 the curtain being adapted to form walls on two sides and the back of the platform to leave one side open toward the wall, and to leave the top open for escape of particles and vapors.

Air currents may pass freely around the edges of the platform and through the mast-receiving opening upwardly through the chamber formed by the curtain.

I further induce air currents to effect removal of particles and vapors from a chamber formed by a curtain or the like, in apparatus of this character, preferably by connecting a pipe 121 (Fig. 11) having perforations 122 to a T 123 located in the conduit, and providing a hand-operated valve 124 whereby the pressure medium in the conduit may be let into the perforate pipe. The pipe 121 is perferably located horizontally adjacent the upper edge of the platform frame and fixed to the transverse strap by clamps 125.

Blasts of air are discharged through the perforations to pass in front of the workman for moving fresh air adjacent his face so that paint spray or the like will be diverted upwardly thereby away from the workman's face, while his arms extend through the sheet of air to manipulate the tool.

When a mast comprises relatively long tubes and a relatively large number of tubes, swaying and slight lateral pressure may cause slight binding of one tube in another and thus increase the frictional engagement and resistance, whereby control of the mast by the workman may be slightly hampered.

Figure 12:
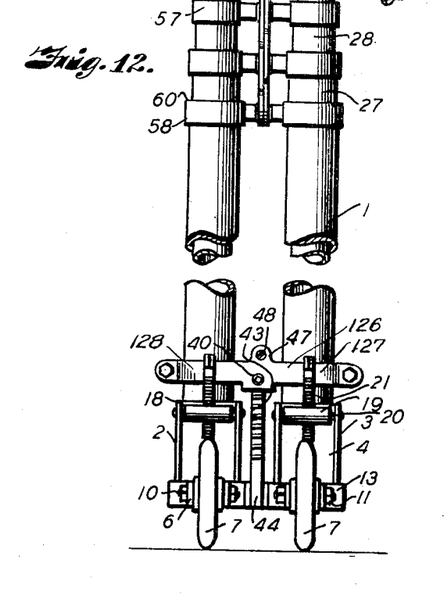
Fig. 12 is a fragmentary elevation of a modified form of apparatus including a pair of platform-supporting extensible masts mounted on a double base.
Figure 13:
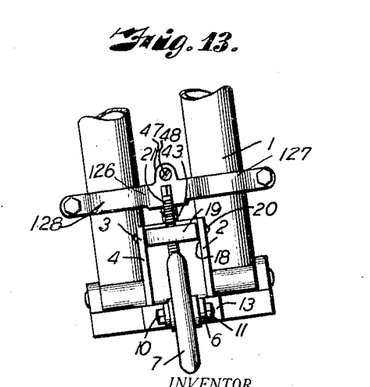
Fig. 13 is a fragmentary perspective view of another modified form in which two telescoping masts are mounted on a base having a single pair of wheels.

In order to overcome and obviate such binding action in masts for particular purposes, I provide a plurality of masts on a single base operating in unison and including tubes, preferably in pairs, connected to each other as shown in Figs. 12 and 13.

In Fig. 12 a modified form of extensible stage is illustrated wherein a relatively wide base is provided comprising channels similar to the channel 4 described for the single base, fixed together in any suitable manner, each channel having wheel forks and wheels at each end.

A mast is pivotally mounted on each base channel as above described, one on each side of the axis of the widened base, a rack sector 43 is fixed to the base members between the masts, and a bracket 126 having collar portions 127 and 128 clamped to the masts supports a worm shaft 48 whereby the worm may engage the rack for tilting the masts synchronously and retaining the masts in tilted position.

The two extensible masts, each constructed as described above for a single mast, have common connections with the bars of the lazy tong device, whereby movement of the two sets of telescoping tubes in unison will be assured. The bosses shown on the collars of single masts are preferably elongated for use in connection with a pair of masts, and the bars are connected thereto and operate between the masts as shown in Fig. 12.

In Fig. 13 two masts are shown pivotally mounted on a single base channel provided with a set of wheels as in the case of the single mast structure, a rack sector 43 being fixed to the base channel between the two masts and the worm shaft 48 being mounted on a bracket including similar collar portions 127—128 fixed to the masts whereby operation of the worm will effect uniform tilting of the masts.

Figure 14:
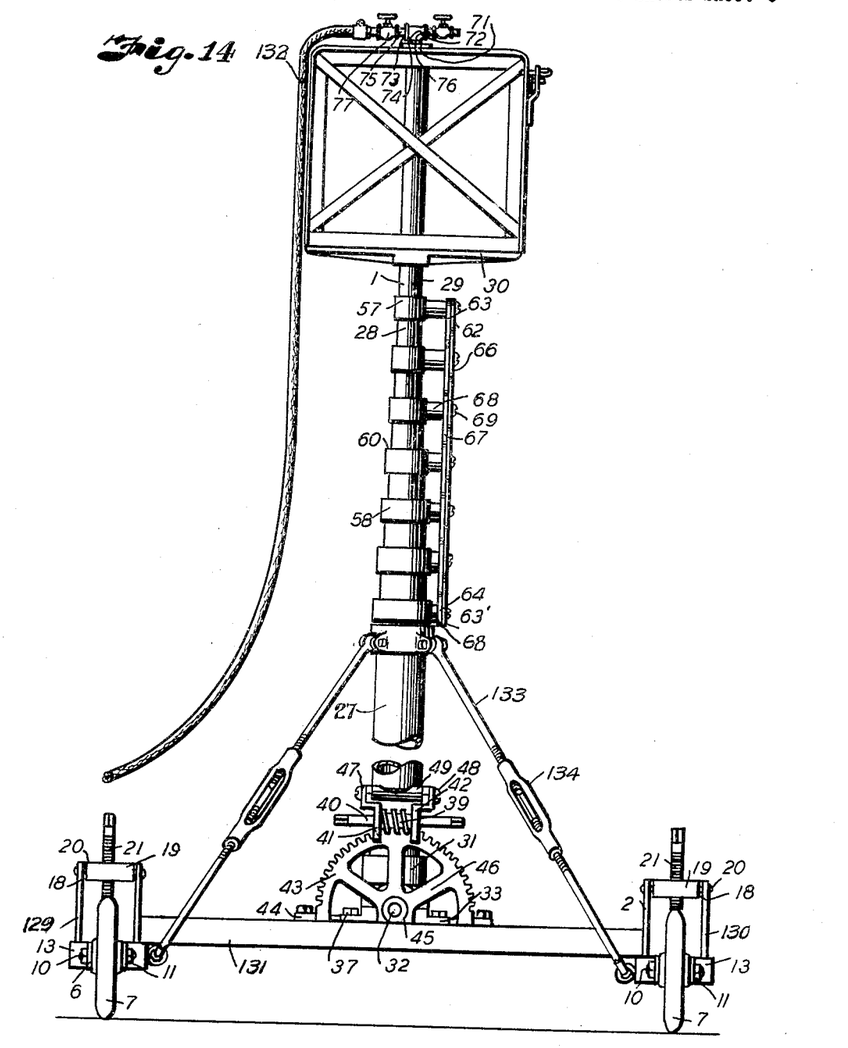
Fig. 14 is a front end elevation of the apparatus illustrating a conduit leading from a compressor on the ground to the platform.

A further modification of the device is shown in Fig. 14 adapted particularly for indoor use in working on ceilings wherein a pair of base channels 129 and 130 are spaced by channel bars 131 to provide a relatively wide wheel base, and one or more extensible masts are mounted on the bars 131 of the wide base, and provided with mast-tilting elements as above described. The base illustrated in this figure may therefore be moved over a supporting floor or similar surface, adjusted to floor inclines, and operated as above described in situations where a vertical wall is not made use of for supporting the upper ends of tilting masts.

In the modified form of apparatus shown in Fig. 14, a flexible hose 132 is illustrated leading from a compressor (not shown) located on the ground, for supplying the pressure medium to the mast in place of the conduit 79 and compressor 110 described in the preferred form.

Braces 133 including adjusting devices such as turn buckles 134 may be applied to the lowermost collar and base to stabilize the mast.

In using the device the parts are disassembled for transportation to the scene of work, for example the mast being removed from the base and the platform and lazy tong bars being separated from the mast.

To reassemble the device, the lazy tong bars will be mounted on the mast tubes, the platform mounted on the upper tube, the pivot shaft seated in the base bearing blocks and moved into the rack hub, and the clamping straps fixed to the base to retain the shaft.

Suitable electrical and pressure medium connections will be made, for example a compressor on the platform being connected to the T fitting, the outlet valve being closed.

A workman may mount the platform and discharge the pressure medium into the mast to effect elevation of the platform. When the desired elevation is reached, the inlet valve may be closed and the pressure medium will retain the platform in the elevated position. Supplemental valves may then be manipulated to provide a pressure medium delivered in any suitable manner, preferably from the source of pressure medium for the mast, for operating a tool and to deliver air for setting up currents to dissipate fog and like particles.

The platform thus forms a crows nest for supporting the workman.

The workman may effect lowering movement of the platform either by gradual or intermittent steps by leaving the outlet valve partly open or opening it intermittently, the wheels on the platform rolling over the wall to prevent scraping thereof.

The platform wheels, when extending in planes perpendicular to a vertical wall, will hold the platform away from the wall, and roll over the wall surface to facilitate vertical movement of the platform.

Figures 8, 9, 10:
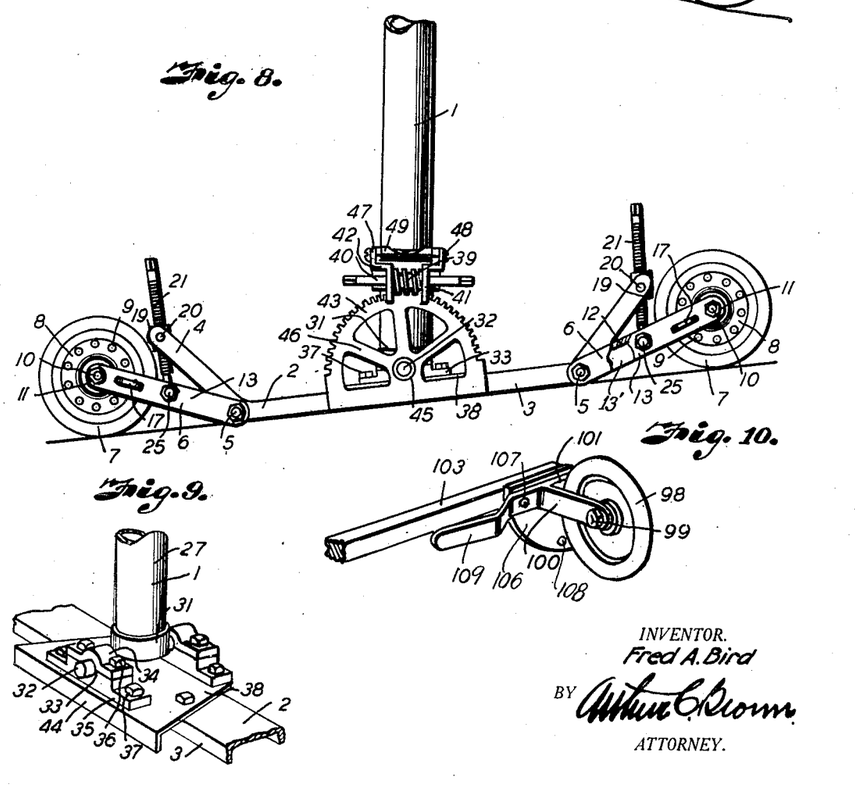
Fig. 8 is a similar view illustrating the base seated on an inclined surface, the mast being adjusted to extend vertically.
Fig. 9 is a fragmentary perspective view of the lower end of the mast particularly illustrating its mountings.
Fig. 10 is a perspective view of a wheel mounted on a bracket pivoted on a platform frame member shown fragmentarily.

When the ground surface is not level, one or both of the base-supporting forks may be moved pivotally to assure level position of the base and both forks may be pivoted upwardly as illustrated in Fig. 8 to seat the base on the ground.

The base wheel-supporting forks will be pivoted only sufficiently to seat the base while maintaining frictional contact of the wheels with the ground and thus anchor the base, the forks being latched to the wheels to prevent rotation of the same by pins extending through the arm slots into the wheel openings.

Should the base be located on an inclined surface, the mast may be tilted by operating the worm before the mast is expanded to cause the mast to extend in a truly vertical direction.

Figure 5:
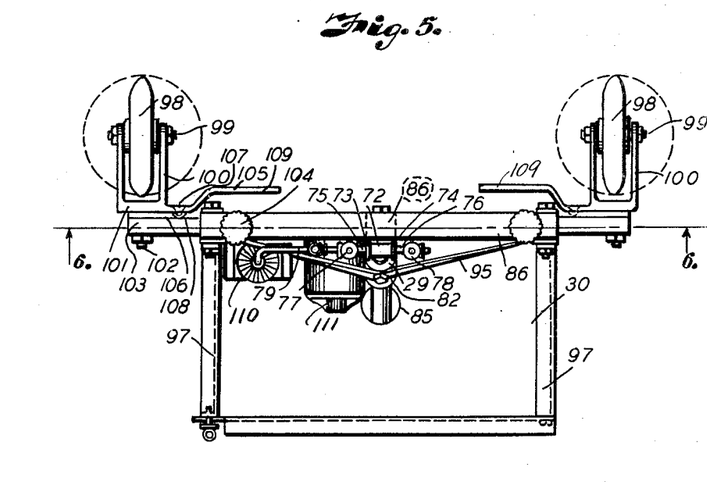
Fig. 5 is a top plan view of the device.
Figure 6:
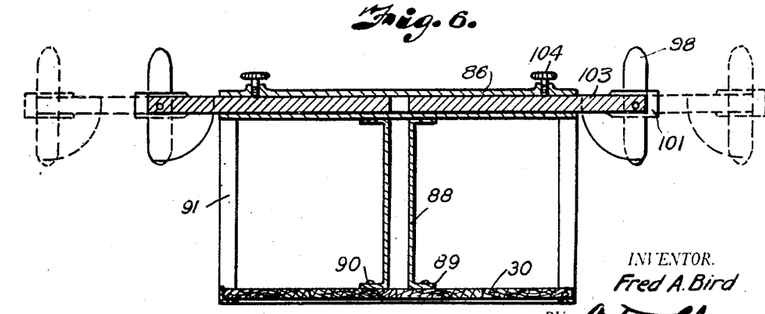
Fig. 6 is a section on the line 6—6, Fig. 5.
Figure 7:
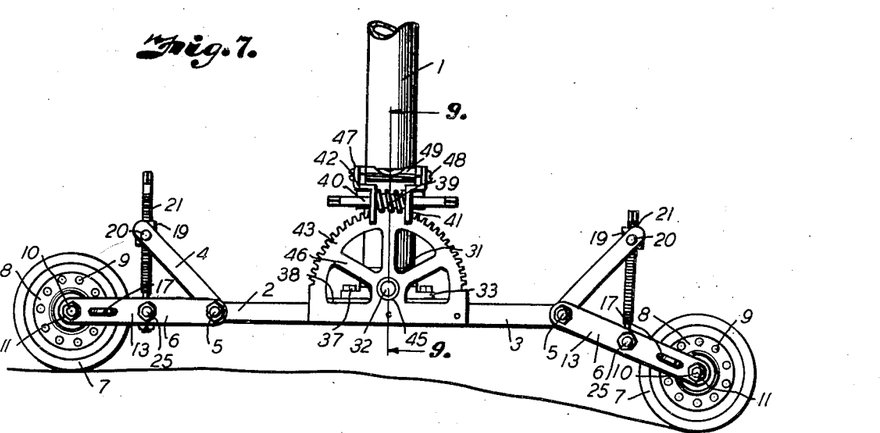
Fig. 7 is a side elevation of the base and adjacent portion of the platform-supporting mast illustrating adjustment of the base to irregular ground contour.

The base wheel forks may be operated to support the device wholly on the wheels, and the device may then be moved horizontally along a wall on the base wheels. To facilitate such repositioning, the platform wheels will be pivoted to extend in horizontal planes as illustrated in Fig. 5 and thus roll laterally over the surface against which the device leans.

Should the new ground position be uneven, the mast may be tilted by a workman on the ground operating the worm to gradually readjust the same into truly vertical position. The platform wheels may be manipulated by the elevated workman to cause the wheels to run on arcs on the wall when the mast is being tilted and the base is retained in a fixed position.

The supplemental air blast means may be adapted to create upwardly moving currents and suction to move particles from the platform, and the curtain may be added to form a chamber and prevent particles from being blown by wind laterally to adjacent buildings or onto persons positioned near the workman. The perforate pipe particularly described provides for jets forming a sheet of fresh air moving between the workman and the surface worked on to protect the workman from paint, fog and the like recoiling from the surface.

The device thus affords a substantially increased factor of safety for workmen operating on vertical walls or ceilings and at similar high positions, greatly reduces the labor and costs of setting up, operating and removing elevated stages, and facilitates the repositioning of stages, and obviates numerous objectionable features of ladders, swinging stages and platforms lifted and lowered by mechanical means not in the control of the workman.

In practice, air will ordinarily be employed as the pressure medium, and a substantial quantity of lubricating oil will be supplied to the lower tube, for example sufficient to substantially fill the smallest tube. The oil will thus be pressed upwardly by the upper tubes as the tubes descend into nesting position, will lubricate the inner surfaces of the tubes over which the gaskets slide, and will be available to the joints of all the tubes when the mast is in retracted position, for lubricating the same.

Pressure of air admitted to the topmost tube will act first through the liquid on the lower end of the second telescoped tube, to extend the mast.

All of the tubes will, however, move equal distances responsively to the pressure medium due to the connection between the tubes afforded by the lazy tong device.

What I claim and desire to secure by Letters Patent is:

1. An extensible stage including a base, a plurality of sets of telescoping tubes mounted on the base, a platform mounted on the sets of tubes, and arms pivoted to said tubes and having outer ends connected with outer ends of adjacent ones of said arms to form lazy tongs for assuring equal movement of telescoping tubes.

2. An extensible stage including a base, a plurality of sets of telescoping tubes including tubes mounted on the base and telescoping tubes slidable in the first named tubes, a platform mounted on the topmost telescoping tubes for connecting the sets of tubes, a lazy tong device comprising arms having inner ends pivotally connected with lower and upper tubes of each of said sets, and intermediate arms having central pivotal mounting on intermediate tubes and outer ends pivoted to outer ends of adjacent ones of said arms, and means for moving the tubes in telescoping relation to each other.

3. In a device of the character described including a pair of telescoping tubes, a platform mounted on one of said tubes, means on the platform including a conduit for supplying a pressure medium to said tubes for extending and retracting the platform, and means for effecting discharge of air from said conduit to atmosphere.

4. In an extensible stage including a pair of telescoping tubes, a platform mounted on one of said tubes, means on the platform including a conduit for supplying a pressure medium to said tubes for extending and retracting the platform, and means communicating with said conduit for discharging a jet of said pressure medium adjacent said platform.

5. An extensible stage including a base, a pair of telescoping tubes mounted on the base to form a mast, a platform on said mast, means on the platform including a conduit for supplying air to said mast, air jet delivering means communicating with said conduit, and means on the conduit for controlling said air supply and air jet means.

6. An extensible stage including a base, a pair of telescoping tubes mounted on the base to form a mast, a platform supported by the topmost one of said tubes, means including a conduit communicating with said topmost tube for supplying air to said mast, and means above said platform for selectively directing air from the conduit to the mast and to atmosphere.

7. In an extensible stage including a mast adapted to be extended and contracted and to lean toward a vertical wall, a platform fixed to the upper end of said mast, wheels movable over the wall, means for adjustably mounting the wheels on the platform, and means for admitting a pressure medium to the mast for effecting movement of the platform vertically to the wall.

8. In an extensible stage including an extensible mast, and means for extending and retracting said mast, a platform mounted on said mast, brackets pivoted to said platform, and wheels mounted on said brackets engageable with a surface toward which the mast may be inclined for spacing the platform from said surface.

9. An extensible stage including a base, an extensible mast tiltable longitudinally on the base, said base and mast being tiltable laterally, a platform secured to said mast, wheels pivotally mounted on said platform, and adapted to engage a surface toward which the base and mast may be tilted, and means for latching said wheels in selected pivoted positions.

10. In a device of the character described including a base, an extensible mast tiltably mounted on the base, a platform secured to the upper end of said mast, brackets pivotally mounted on said platform, wheels mounted on said brackets and adapted to engage a surface to space the platform from said surface, and means for latching said brackets in selected pivoted positions.

11. In an extensible stage, a wheeled base, an extensible mast tiltably mounted on said base, a platform mounted on said mast, brackets pivoted to said platform, and wheels mounted on said brackets to engage a surface toward which the base and mast may be inclined.

12. An extensible stage including a wheeled base, a mast mounted on the base, a platform secured to said mast, extension brackets slidably mounted on said platform, and wheels mounted on said brackets to engage a surface toward which the mast may be inclined.

13. In apparatus of the character described including an extensible mast, a frame mounted on the mast, a platform on the mast, means for delivering an air blast adjacent the platform, means including brackets mounted on the frame, a curtain on said brackets forming a chamber for a workman positioned on the platform, and means including a valved perforate pipe communicating with the air delivering means for moving air from said chamber.

14. An extensible stage including a series of telescoping tubes, means tiltably supporting the tubes, a platform supported by the topmost tube, and means on the platform including a conduit having valved branches for selectively delivering a pressure medium to atmosphere and to the topmost tube for operating the stage.

15. An extensible stage including a series of telescoping tubes, a platform fixed to the topmost tube for support by the series of tubes, a fitting on the upper end of the topmost tube having valved inlet and outlet branches, and means for supplying a pressure medium to the inlet branch for delivery to the tubes to extend the stage.

16. An extensible stage including a series of telescoping tubes, a platform fixed to the topmost tube for support by the series of tubes to support a workman adjacent a surface to be worked on, a fitting mounted on the upper end of the topmost tube and having an inlet branch for movement of air under pressure to the topmost tube for extending the tubes and an outlet branch for relieving the tubes of air pressure, a valved bypassing conduit communicating with said inlet branch for enabling the workman to employ air under pressure in performing the work, a valve in said inlet branch between the bypassing conduit and the topmost tube to enable the workman to control delivered air under pressure to the tubes, a valve in the outlet branch to enable the workman to effect retention of air in the tubes for maintaining the tubes in extended position, and means for delivering air under pressure to said inlet branch.

17. In an extensible stage including a series of telescoping tubes and means including a conduit for supplying a pressure medium under pressure, a platform mounted on and supported by the topmost tube, and fittings mounted on the topmost tube and including an inlet nipple communicating with the topmost tube, and valved means connected with the conduit for selectively effecting discharge of the pressure medium to the topmost tube and to atmosphere.

18. In an extensible stage including a series of telescoping tubes and a platform fixed to the upper end of the topmost tube for support by the series of tubes, a nipple fixed in the upper end of the topmost tube, a fitting mounted on the nipple and including an inlet conduit having valved communication with the nipple and a valved bypass, and means for delivering a pressure medium to the inlet conduit for movement of said medium selectively through the bypass and the nipple.

19. An extensible stage including a series of telescoping tubes, a platform fixed to and supported by the topmost tube, means including a conduit having an outlet end portion located adjacent the platform for supplying a pressure medium to the tubes, means connected with the conduit and including a nipple in the upper end of the topmost tube for conducting the pressure medium to and from the tubes and including means for retaining the pressure medium in the tubes, and a valved bypass connected with said outlet end portion of the conduit for delivering pressure medium from the conduit while pressure medium is retained in the tubes.

20. An extensible stage including a base, a mast including a plurality of telescoping tubes mounted on the base, means including exterior collars on the upper ends of selected tubes and bushings in the tubes connected with the collars for sealing the joints between the tubes, and a lazy tong device including bars pivotally mounted on said collars for causing the tubes to move in unison.

21. An extensible stage including a base, a mast including a plurality of telescoping tubes mounted on the base, means including exterior collars on the upper ends of selected tubes for sealing the joints between the tubes, means for delivering a pressure medium to the tubes to cause the tubes to move in telescoping relation, and a lazy tong device including bars pivotally mounted on said collars for causing the tubes to move in unison.

22. In apparatus of the character described, a base, a mast, means for supporting the base longitudinally in selectively horizontally and longitudinally tilted positions, and means tiltably supporting the mast on the base longitudinally of the base to compensate for the tilted position of the base.

23. In apparatus of the character described including an elevated stage and a source of air under pressure, a pipe extending horizontally across the stage and having upwardly directed perforations, and means connecting the pipe with the source of air for setting up air currents adjacent the stage.

24. In apparatus of the character described, a support, a plurality of sets of telescoping tubes mounted on the support, a platform carried by the topmost tubes of the sets, collars on the ends of the tubes, means for connecting the collars of the respective tubes together whereby the tubes in each set operate in synchronism with the corresponding tubes in the other sets, and means for admitting a pressure medium to the sets of tubes to extend the tubes for raising the platform.

In testimony whereof I affix my signature.

FRED A. BIRD.